United States Patent [19]

Atsukawa et al.

[11] 4,040,803

[45] Aug. 9, 1977

[54] WET WASTE FLUE GAS DESULFURIZING PROCESS USING LIME AS ABSORBENT

[75] Inventors: Masumi Atsukawa; Kazumi Kamei; Naoharu Shinoda; Hiroyuki Ushio, all of Hiroshima, Japan

[73] Assignee: Mitsubishi Jukogyo Kabushiki Kaisha, Tokyo, Japan

[21] Appl. No.: 667,972

[22] Filed: Mar. 18, 1976

Related U.S. Application Data

[63] Continuation of Ser. No. 549,031, Feb. 11, 1975, abandoned, which is a continuation-in-part of Ser. No. 298,822, Oct. 19, 1972, abandoned.

[51] Int. Cl.² .................................... B01D 53/14
[52] U.S. Cl. ............................... 55/73; 55/94; 423/242
[58] Field of Search ............... 423/232, 242, 430, 432, 423/572, 544, 554, 555; 55/73, 85, 94

[56] References Cited

U.S. PATENT DOCUMENTS

| 3,556,722 | 1/1971 | Owaki | 423/242 |
| 3,794,714 | 2/1974 | Atsukawa et al. | 423/242 |

FOREIGN PATENT DOCUMENTS

| 2,161,476 | 7/1972 | Germany | 55/73 |

Primary Examiner—John Adee
Attorney, Agent, or Firm—Wenderoth, Lind & Ponack

[57] ABSTRACT

A wet waste flue gas desulfurizing process using lime as absorbent, wherein a sulfur oxide-containing waste flue gas is washed with a liquid absorbent containing calcium hydroxide or calcium carbonate for the purpose of removing the sulfur oxide from said waste flue gas, characterized in that an absorbing device is divided into two stages, i.e. a former stage absorbing device and a latter stage absorbing device, arranged in tandem with respect to the flow of said waste flue gas, and the liquid absorbent is circulated in the former stage absorbing device at a lime available percentage of more than 96% and in the latter stage absorbing device at a lime available percentage of 85 - 95%.

1 Claim, 5 Drawing Figures

WET WASTE FLUE GAS DESULFURIZING PROCESS USING LIME AS ABSORBENT

BACKGROUND OF THE INVENTION

This a continuation of application Ser. No. 549,031, which in turn is a continuation-in-part of applicants' copending application Ser. No. 298,822, filed Oct. 19, 1972 both abandoned.

1. Field of the Invention

This invention relates to a method of increasing the sulfur oxide absorption rate as well as the available percentage of lime used as absorbent and also preventing the formation of a scale, in a process for removing sulfur oxide from waste flue gases, using lime as absorbent.

2. Description of the Prior Art

For the removal of sulfur oxide from combustion gases which is the major element for air pollution, a process using as absorbent a suspension of lime which is easy to procure and inexpensive, is quite advantageous. However, in order to operate this process economically, it is necessary to increase the reaction ratio between the lime in the liquid absorbent and the sulfur oxide, i.e., the available percentage of the lime, concurrently with increasing the sulfur oxide absorption rate. Theoretically speaking, the amount of lime necessary for the absorption of sulfur oxide is stoichiometrically equivalent to the amount of sulfur oxide contained in a waste flue gas to be treated, but in practice a considerably large amount of lime in excess of the stoichiometrical equivalent mentioned above is required for obtaining a high absorption rate of sulfur oxide by washing the waste flue gas containing the sulfur oxide at a low concentration, by reason of the contact efficiency in a gas-liquid-solid contacting apparatus used and the solid elution rate. Accordingly, the liquid discharged from the absorbing apparatus contains a considerable amount of unreacted lime. This not only is disadvantageous economically but also, where it is desired to recover gypsum from the used liquid absorbent, necessitates the additional step of converting the unreacted lime into a sulfate or sulfite by either neutralizing it with sulfuric acid or reacting it with sulfur oxide gas of high concentration, before it is delivered to a gypsum recovery step. In the process of this invention, the absorption step is divided into two stages and each of the two stages is operated in such a manner that a circulating liquid absorbent may be maintained at a prescribed lime concentration, whereby the above-described disadvantages of the conventional process are obviated and the formation of a scale in the absorbing device is avoided, which has been a problem in the conventional process.

SUMMARY OF THE INVENTION

The object of the present invention is to provide a wet waste flue gas sulfurizing process using lime as absorbent, wherein a sulfur oxide-containing waste flue gas is washed with a liquid absorbent containing calcium hydroxide or calcium carbonate for the purpose of removing the sulfur oxide from said waste flue gas, characterized in that an absorbing device is divided into two stages, i.e. a former stage absorbing device and a latter stage absorbing device, arranged in tandem with respect to the waste flue gas flow and the liquid absorbent is circulated in the former stage absorbing device at a lime available percentage of more than 69% and in the latter stage absorbing device at a lime available percentage of 85–95%.

DESCRIPTION OF THE PREFERRED EMBODIMENTS

Figure 1:
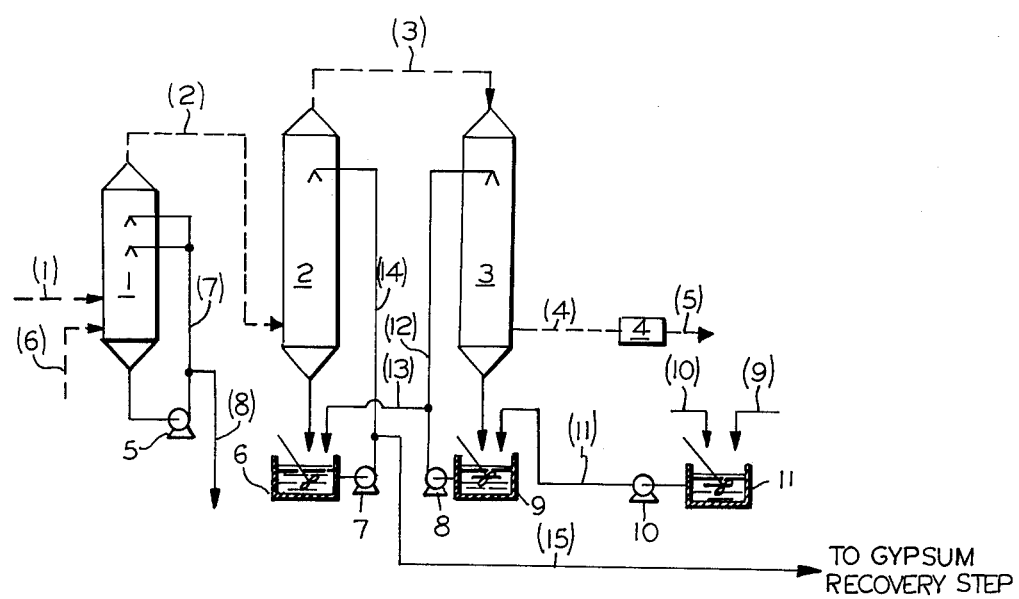
FIGS. 1, 4 and 5 are schematic diagrams respectively showing modes of practice of the process according to this invention.
Figure 2:
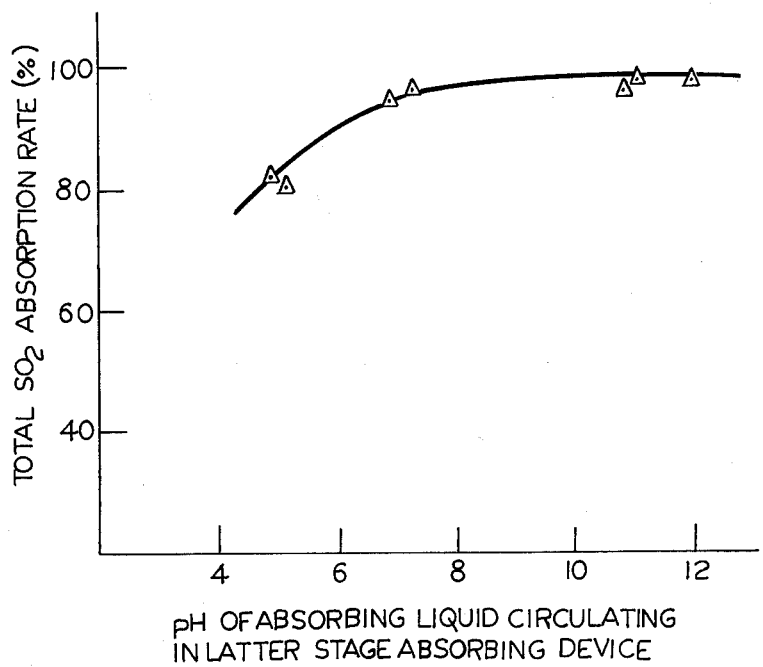
FIGS. 2 and 3 are diagrams graphically illustrating the effects of the process of this invention respectively.

A mode of practice of the process of this invention will be practically described hereunder with reference to FIG. 1.

A sulfur oxide-containing waste flue gas (1) at a temperature of about 140° C is introduced into a gas cooling tower 1, in which it is contacted by water which is supplied by a pump 5 and sprayed from a nozzle, and thereby is humidized and cooled to about 55° C. The flue gas thus humidized and cooled is fed into a former stage absorbing device 2 along a line 2. Part of the water circulating in the gas cooling tower 1 is discharged from the absorbing system to the outside to purge dusts collected from the gas, as indicated at 8, and fresh water is supplied into the tower to make up the amounts of the purged water and evaporating water, as indicated at 6. The gas introduced into the former stage absorbing device 2 is washed therein with a lime-containing absorbing liquid supplied through a pump 7, whereby the sulfur oxide contained in the gas is partially removed therefrom. Thereafter, the gas is led into a latter stage absorbing device 3. In the latter stage absorbing device 8, as in the former stage absorbing device 2, the gas is washed with the lime-containing absorbing liquid, whereby the remaining part of the sulfur oxide contained in said gas is absorbed by said absorbing liquid and removed therefrom. The gas leaving the latter stage absorbing device, which is substantially free of sulfur oxide, is passed through a mist separator 4 as indicated at 4 to have a mist separated therefrom and the resultant clean gas is delivered to a chimney as indicated at 5. Each of the former and latter absorbing devices is provided therein with means, such as a filler, which is generally used industrially, to achieve effective contact between the gas and absorbing liquid, and also has a demister provided therein as required to separate the mist from the gas.

Now, the flow of the absorbing liquid will be desrcibed. First of all, a finely divided lime material 9, such as powdered quick lime, slaked lime or limestone, and water 10 are supplied into an absorbent preparation tank 11 and mixed therein with stirring to form a slurry. The slurry thus formed is supplied into an absorbing liquid circulation tank 9 of the latter stage absorbing device through a pump 10 as indicated at 11, and then the absorbing liquid is supplied into the latter stage absorbing device 3 through a pump 8 as indicated at 12. The absorbing liquid, after reaction with the sulfur oxide contained in the gas within the latter stage absorbing device, is returned to the absorbing liquid circulation tank 9 and again recycled into the latter stage absorbing device 3 through the pump 8. During this period, the major part of the lime in the absorbing liquid is converted into calcium sulfite by the reaction with sulfur oxide. Part of the absorbing liquid is withdrawn from this circulation system and fed into an absorbing liquid circulation tank 6 of the former stage absorbing device as indicated at 13. The absorbing liquid supplied in the absorbing liquid circulation tank 6 is circulated through a pump 7, the former stage absorbing device 2 and the absorbing liquid circulation tank 6, as in case of the latter stage absorbing device, and during this period, the unreacted lime contained in the absorbing liquid supplied from the circulation system of the latter stage absorbing device is converted into calcium sulfite. The calcium sulfite in the absorbing liquid circulating in the former and latter stage absorbing device is partially oxidized into calcium sulfate, depending upon the sulfur oxide concentration and oxygen concentration in the waste flue gas being treated and the pH value of the absorbing liquid. In the manner described, the unreacted lime is subtantially removed from the absorbing liquid and the absorbing liquid substantially free of unreacted lime is withdrawn from the circulation system and delivered to a gypsum recovery step as indicated at 15. In the gypsum recovery step, gypsum is recovered from the used absorbing liquid through the usual steps of pH adjustment, oxidation and filtration.

A waste flue gas from the combustion of heavy oil was treated by the same system as described above, using a packed tower having plates assembled therein in the shape of a lattice, for each of the former and latter stage absorbing devices. Table 1 shows the values actually measured in the treatment of the waste flue gas.

Table 1

| | | | | |
|---|---|---|---|---|
| Amount of gas (m$^3$/h) | | | 2,000 | 2,000 |
| Amount of slurry circulating in absorbing device (m$^3$/h) | | | 10 | 14 |
| Concentration of slurry (wt%) | | | 6 | 6 |
| Former stage absorbing device | Waste flue gas | Inlet SO$_2$ (ppm) | 2,095 | 1,110 |
| | | Outlet SO$_2$ (ppm) | 1,704 | 1,028 |
| | Absorbing liquid | pH | 3.9 | 4.0 |
| | | CaCO$_3$ (mol/l) | 0.001> | 0.001> |
| | | CaSO$_3$ . ½H$_2$O (mol/l) | 0.143 | 0.143 |
| | | CaSO$_4$ . 2H$_2$O (mol/l) | 0.354 | 0.354 |
| Latter stage absorbing device | Waste flue gas | Inlet SO$_2$ (ppm) | 1,704 | 1,023 |
| | | Outlet SO$_2$ (ppm) | 216 | 38 |
| | Absorbing liquid | pH | 7 | 7 |
| | | CaCO$_3$ (mol/l) | 0.035 | 0.032 |
| | | CaSO$_3$ . ½H$_2$O (mol/l) | 0.24 | 0.199 |
| | | CaSO$_4$ . 2H$_2$O (mol/l) | 0.25 | 0.279 |
| Summary | SO$_2$ absorption rate (%) | | 90.8 | 96.7 |
| | Lime available percentage (%) | | 100 | 100 |

As shown, the lime available percentage was 100% and the sulfur oxide absorption rate was higher than 90%, and the formation or deposition of a scale within the absorbing devices was not observed at all.

The characteristic features of the process of this invention will be described in greater detail hereunder: The first feature lies in overcoming the trouble caused by the attachment of the scale formed in the treatment of a sulfur oxide-containing gas with a lime slurry by an entirely novel method. In the past, it has generally been believed that the formation of a scale is attributable to the fact that an absorbing liquid is excessively saturated with gypsum as a result of a calcium sulfite in the absorbing liquid being oxidized with oxygen contained in the gas and converted into calcium sulfate, and said calcium sulfate precipitates to form the scale. Therefore, an attempt has been made to lower the degree of excessive saturation of the absorbing liquid with gypsum, as a countermeasure to the scale problem, and it is a conventionally known method to add seeds of gypsum to the circulating absorbing liquid. It is also known, as means for increasing the effect of the gypsum seeds added, to retain the gypsum seeds for a certain period of time in the absorbing liquid after said seeds have been added. What is important to note here is that the present inventors have found through experiments that there are two types of scale, namely a relatively hard scale consisting of gypsum as mentioned above and a relatively soft scale consisting of a mixture of calcium carbonate, calcium sulfite and gypsum. The formation of the former hard scale can be suppressed as by the addition of gypsum seeds described above, but the precipitation of the latter scale is unavoidable and only encouraging the flow of circulating absorbing liquid is insufficient to eliminate the scale. In the past, an absorbing device has become inoperable after a few days of operation due to the soft scale deposited on the inner surface thereof, and therefore, it has been necessary, when the absorbing device became inoperable, to open the device, remove the deposited scale and further wash the inner surface of the device with a liquid chemical. The present inventors have found the following fact concerning the removal of such soft scale. Namely, the present inventors have found that, by operating the absorbing device while maintaining the pH value of an absorbing liquid, circulating in said absorbing device, not higher than 7.0 but lower than 6.5, the absorbing device can continuously be operated without allowing precipitation or attachment of the scale and with a sulfur oxide removing rate substantially the same as when the pH value is near 11. This is because, when the pH value of the absorbing liquid becomes small, so that said absorbing liquid is reduced in visosity and hence in adhesiveness. It should be noted, however, that the pH of the absorbing liquid must be maintained within the range specified above as excessively low pH will result in reduction of the sulfur oxide absorption rate.

Another feature of the invention lies in that the available percentage of the lime used is increased to near 100% and the pH value of the absorbing liquid is lowered to a level at which gypsum can be advantageously recovered. Namely, in the conventional process a consideration has generally been given only to increasing the sulfur oxide removing rate and, for waste flue gases maintaining sulfur oxide at relatively low concentrations, which are regarded as a source of air pollution, it has been believed difficult to increase the available percentage of lime used for the removal of sulfur oxide and to lower the pH value of the absorbing liquid to a desired level. Therefore, in the conventional process there has been employed a method in which sulfurous acid gas of high concentration is introduced into a desulfurization system from the outside to be absorbed by the absorbing liquid, so as to eliminate the unreacted-lime and adjust the pH value of said absorbing liquid to the desired level.

Figure 3:
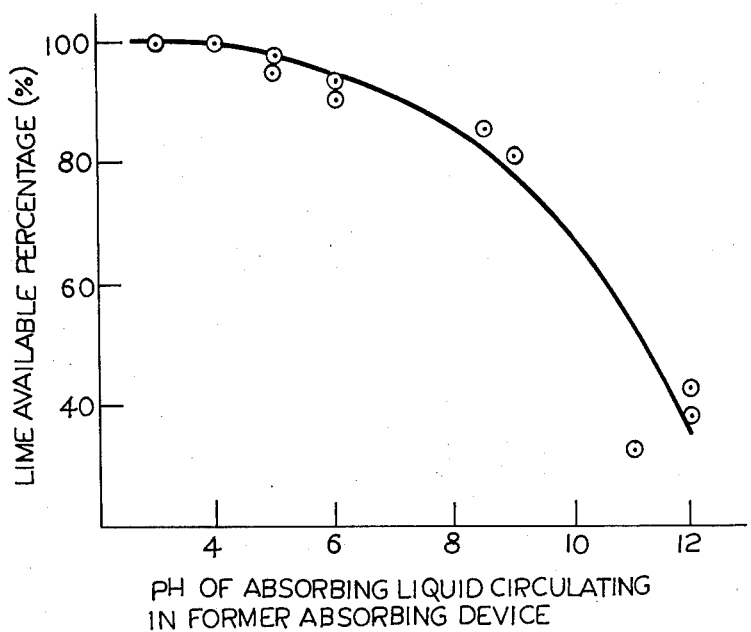

In the process of this invention, as described above with reference to FIG. 1, the absorbing device is divided into the former stage absorbing device 2 and latter stage absorbing device 3, and a waste flue gas to be treated is passed successively in said first and second stage absorbing devices 2 and 3, while an absorbing liquid containing a lime slurry is circulated first in the latter stage absorbing device 3 and then in the former stage absorbing device 2, and furthermore the lime available percentage of the absorbing liquid is regulated so that it is between 85–95% in said latter stage absorbing device and more than 96% in said former stage absorbing device so that absorption of sulfur oxide may be mainly carried out in the latter stage absorbing device and reaction of the unreacted lime in the former stage absorbing device. Thus, it has become possible to maintain concurrently both a high sulfur oxide absorption rate and a high lime available percentage. As may be understood from FIG. 3, substantially no unreacted lime remains in the absorbing liquid when the process is carried out while maintaining the pH value of the absorbing liquid in the former stage absorbing device within the range of 3.5–4.0 . Excessive lowering of the pH value is undesirable because of the increasing corrosive action of the absorbing liquid.

Another advantage of dividing the absorbing device into two stages is that, in achieving both a sulfur oxide absorption rate and a high lime available percentage concurrently, the height of the towery absorbing devices can be drastically reduced as compared with the case of using a single absorbing device. For instance, in treating a combustion gas containing sulfur oxide at a concentration of 1,000 ppm, using the lattice type packed tower and with a liquid-to-gas ratio of 7 $l/m^3$ and a gas flow rate of 3 m/sec., the effective height of the scrubber necessary to obtain 90% of sulfur oxide absorption rate and 96% of lime available percentage is 17.3 m when said scrubber consists of a single absorbing tower, and is only 11 m in total when said scrubber is divided into two stage absorbing towers.

Figure 4:
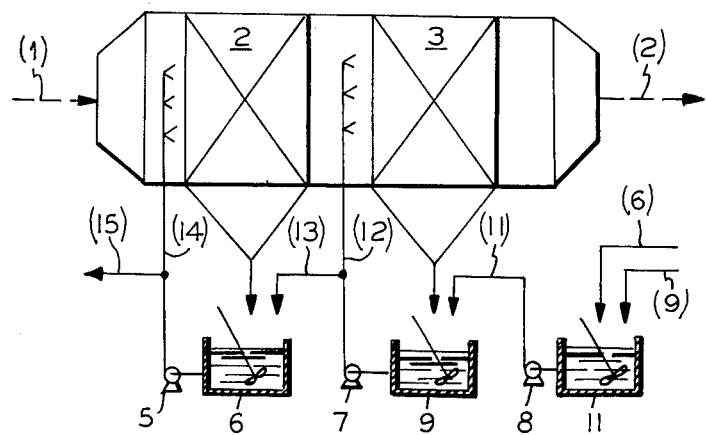
Figure 5:
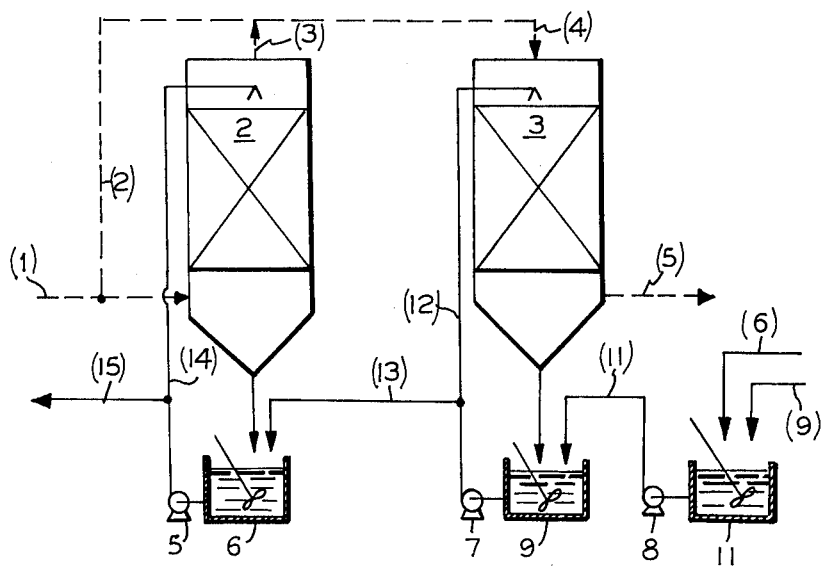

In short, it is only essential in the present invention to divide the absorbing step into two stages operated successively with respect to the flow of gas and to maintain the lime available percentage of the circulating absorbing liquid within the range of more than 96% in the former stage and at a percentage of 85–95% in the latter stage. Therefore, the process of this invention may be operated, besides the type of apparatus described hereinbefore, by an apparatus as shown in FIG. 4 in which only one absorbing device is used and the interior of said absorbing device is divided into two sections for first and second stages of absorption, or by an apparatus as shown in FIG. 5, depending upon the sulfur oxide concentration in a waste flue gas to be treated, in which the inlet gas for a first stage absorbing device is diverged into two flows and one of them is introduced directly into a latter stage absorbing device and the other one of them into said latter stage absorbing device via the former stage absorbing device.

What is claimed is:

1. In a wet waste flue gas desulfurizing process using lime as absorbent, wherein a sulfur oxide-containing waste flue gas is washed with a liquid absorbent containing calcium hydroxide or calcium carbonate for the purpose of removing the sulfur oxide from said waste flue gas, the improvement wherein a liquid absorbent is circulated through an absorbing device divided into two stages arranged in tandem with respect to the flow of the waste flue gas, said liquid absorbent being circulated and controlled in both stages, such that in the first state absorbing device the liquid absorbent has a lime available percentage of more than 96% and controlled in the second stage absorbing device such that the liquid absorbent has a lime available percentage of 85–95%.

* * * * *